US005992538A

United States Patent [19]

Marcengill et al.

[11] Patent Number: 5,992,538

[45] Date of Patent: Nov. 30, 1999

[54] IMPACT TOOL DRIVER

[75] Inventors: Richard L. Marcengill, Walhalla; Gary L. Young, Six Mile; William C. Buck, Clemson, all of S.C.

[73] Assignee: Power Tool Holders Incorporated, Wilmington, Del.

[21] Appl. No.: 08/962,255

[22] Filed: Oct. 31, 1997

Related U.S. Application Data

[63] Continuation-in-part of application No. 08/908,777, Aug. 8, 1997, abandoned.

[51] Int. Cl.[6] .......... B23B 31/04

[52] U.S. Cl. .......... 173/93; 173/93.5; 173/211; 173/171

[58] Field of Search .......... 173/211, 212, 173/93, 93.5, 128, 114, 171

[56] References Cited

U.S. PATENT DOCUMENTS 1,925,714 9/1933 Crist .
2,227,627 1/1941 Bruzon .
2,794,621 6/1957 Beeson .
2,923,191 2/1960 Fulop .
2,940,565 6/1960 Schodeberg .
3,312,260 4/1967 MacNeill .......... 81/177.85
3,938,817 2/1976 Röhm .
3,948,534 4/1976 Schnizler, Jr. et al. .
4,116,454 9/1978 Schnizler, Jr. et al. .
4,277,074 7/1981 Kilberia .
4,434,859 3/1984 Rumpp et al. .
4,563,013 1/1986 Hunger et al. .
4,607,855 8/1986 Röhm .
4,682,918 7/1987 Palm .
4,695,066 9/1987 Röhm .
4,703,941 11/1987 Röhm .
4,955,623 9/1990 Röhm .

*Primary Examiner*—Scott A. Smith
*Attorney, Agent, or Firm*—Dority & Manning

[57] ABSTRACT

A portable impact tool driver is removably attachable to a drive spindle or shaft of a conventional power tool. The impact tool driver has a body member with a drive shaft configured with the body member so as to be rotationally driven thereby. A hammer member is rotationally coupled to the drive shaft and is rotationally driven by the drive shaft. The hammer member is also axially movable along the drive shaft. The hammer has a first impact face configured thereon with at least two impact drivers defined on the impact face. A coupling drive mechanism is disposed between the drive shaft and the hammer member and imparts a rotational and longitudinal movement to the hammer member. An anvil member has a second impact face opposite the first impact face with an impact receiver configured thereon for periodic impacting engagement with the impacted drivers. The hammer member is rotationally driven by the drive shaft while simultaneously being moved axially back and forth relative to the drive shaft so that the impact drivers move into and out of rotational impacting engagement with the impact receivers defined on the anvil member.

18 Claims, 11 Drawing Sheets

FIG. 8A
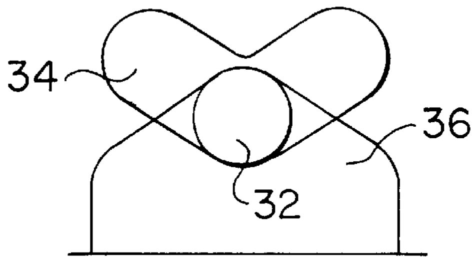
FIG. 8B
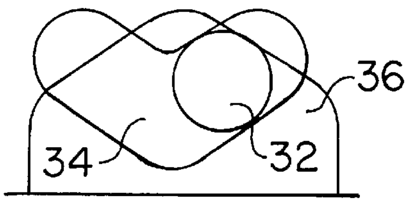
FIG. 8D
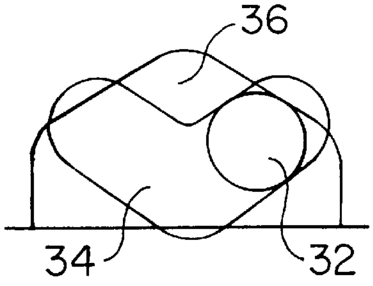
FIG. 8C
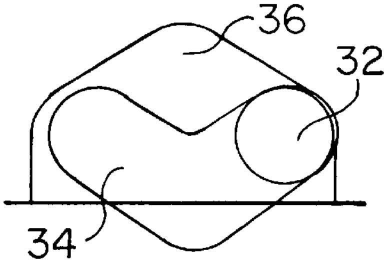
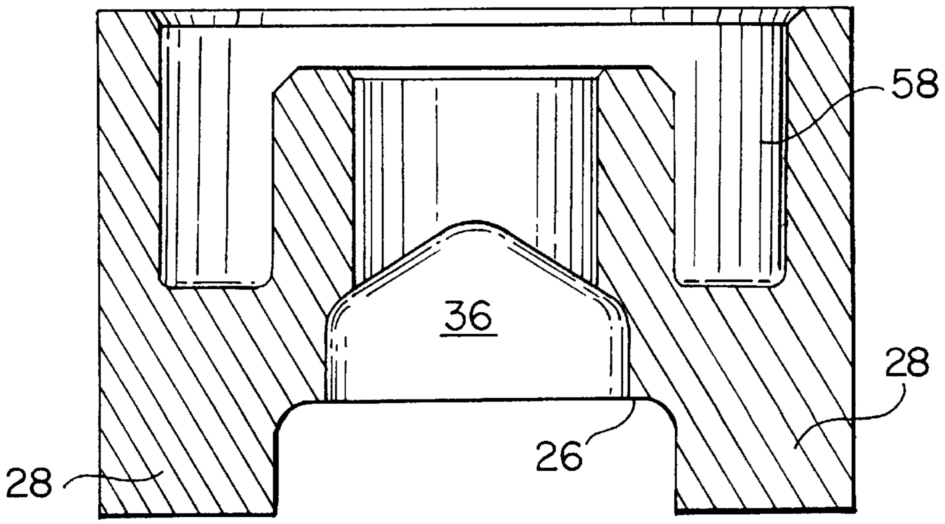
FIG. 9

IMPACT TOOL DRIVER

The present application is a Continuation-in-Part Application of U.S. application Ser. No. 08/908,777, filed on Aug. 8, 1997 now abandoned.

BACKGROUND OF THE INVENTION

The present invention relates to an impact drive device configured for attachment to a drive spindle or chuck of a power tool, for example a hand drill, and more particularly to a portable tool drive incorporating an impact drive mechanism.

The benefits of impact drive mechanisms are well understood by those skilled in the art. For example, impact drive mechanisms are conventionally incorporated into impact air wrenches and conventional hammer drills. These mechanisms add the additional benefit of a hammering effect to conventional rotational drives.

However, a drawback of conventional impact drive mechanisms is that such devices are typically only incorporated directly into the drive device of the drill or power tool. In other words, the entire tool constitutes the impact drive mechanism, and there are certain situations wherein an impact drive is not desired. Thus, the impact drive tools of the known conventional devices are relatively sophisticated and expensive to manufacture and own, and generally can only be used as an impact tool.

U.S. Pat. No. 4,840,387 to McCarthy describes a keyless chuck device for attachment to a drive spindle of a drill in which the operating sleeve has impact members biased toward mating impact members associated with the rotatable nut. The impact dogs disclosed in the '387 patent are meant to increase the tightening (or loosening) effect of the chuck device on a tool shank carried therein depending on the direction of rotation of the body of the chuck. The chuck does not impart an impact drive to the tool bit once the chuck is tightened onto the tool bit.

OBJECTS AND SUMMARY OF THE INVENTION

It is therefore a principal object of the present invention to provide an impact tool driver which is portable in nature and can be attached to a drive spindle of any conventional tool, such as a conventional power drill.

An additional object of the present invention is to provide an impact tool drive which can be easily carried by any conventional chuck device and which thus converts any conventional drill into an impact drive tool.

Still a further object of the present invention is to provide an impact tool driver which can convert any manner of conventional drive tool to an impact drive tool.

And yet another object of the present invention is to provide an impact tool driver having an impact drive mechanism which is relatively simple and inexpensive to manufacture.

Additional objects and advantages of the invention will be set forth in part in the following description, or may be obvious from the description, or may be learned through practice of the invention.

According to the objects and purposes of the invention, an impact tool drive is provided which is configured for removable attachment to a drive spindle or chuck of a power tool, for example a conventional hand drill or similar device. The impact tool driver includes a body member which is removably connectable to a rotational drive member of the power tool. A drive shaft is operably configured with the body member so as to be rotationally driven therewith. In a preferred embodiment of the invention, the drive shaft is formed as an integral part of the body member. A hammer member is rotationally coupled to the drive shaft so as to be rotationally driven thereby. The hammer member is axially movable relative to the drive shaft. The hammer member includes a first impact face configured thereon with at least two impact drivers defined on the impact face. A coupling drive mechanism is disposed between the drive shaft and the hammer member to impart rotational and longitudinal movement to the hammer member. An anvil member includes a second impact face opposite the first impact face of the hammer member with an impact receiver configured thereon for periodic impacting engagement with the impact drivers. The anvil member further comprises means for connecting a tool or working device thereto. The hammer member is rotationally driven by the drive shaft while simultaneously moved axially back and forth relative to the drive shaft so that the impact drivers move into and out of rotational impacting engagement with the impact receiver. Preferably, a biasing member, such as a spring, axially biases the hammer member into engagement with the anvil member.

In the preferred embodiment, the coupling device between the drive shaft and hammer member comprises a helical groove defined in the drive shaft and a complimenting radially opposite groove defined in the hammer member. A drive ball is disposed in the grooves wherein the helical groove and drive ball impart rotational and axial movement to the hammer member as the drive shaft rotates.

The impact drivers preferably comprise circumferentially spaced lugs defined on the first impact face. The impact receiver comprises corresponding protruding members defined on the second impact face which define radially opposite legs with circumferential recesses defined between the legs. The lugs are axially movable into and out of the circumferential recesses for periodic rotational engagement with the protruding members as the drive shaft rotates.

In an alternative preferred embodiment of the invention, the body member defines a shaft that further comprises first and second axially separated shaft sections. An elastomeric coupling device is used to rotationally couple the two shaft sections. This embodiment is particularly desirable in that the elastomeric coupling absorbs a significant amount of the vibrations imparted back to the power tool or user through the body member.

The present inventive impact tool driver is useful in any environment wherein an impact drive mechanism is desired, and is not limited to any particular type of tool or drive. For instance, although the present impact tool driver will have particular usefulness with portable hand drills, the invention is not limited to this environment. Additional uses and environments are within the scope and spirit of the invention.

BRIEF DESCRIPTION OF THE DRAWINGS

FIGS. 8a–8d are sequential diagrammatic views illustrating the coupling drive engagement between the drive shaft and hammer member;

FIG. 9 is a cut-away view of the hammer member;

DETAILED DESCRIPTION OF THE PREFERRED EMBODIMENTS

Figure 1:
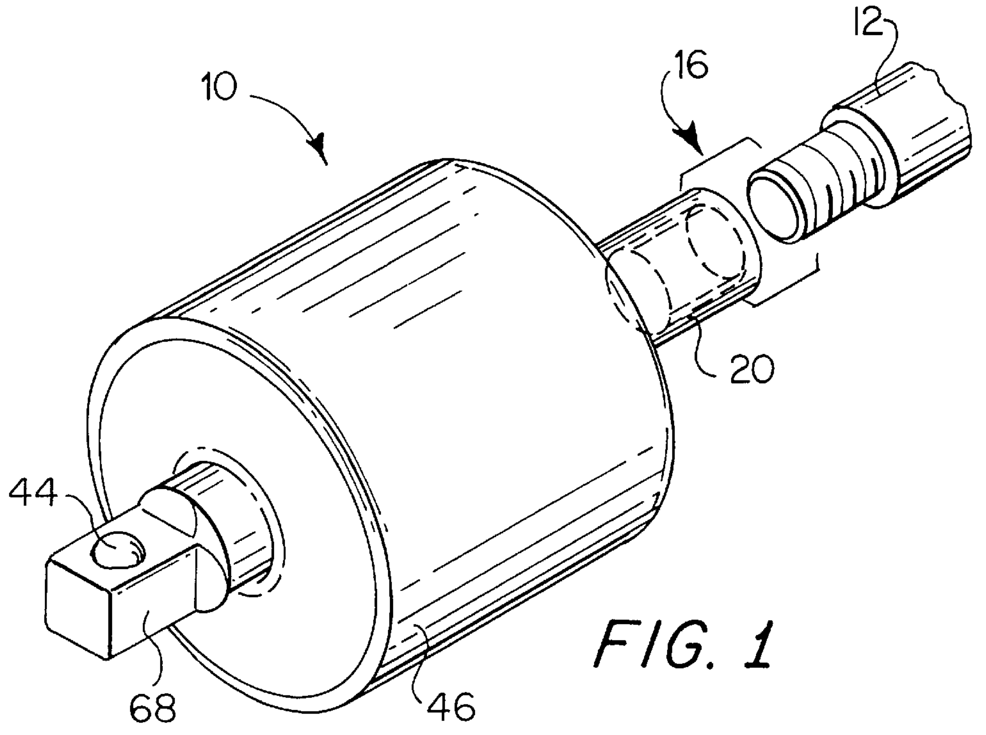
FIG. 1 is a perspective view of an embodiment of the present invention in threaded engagement with a drive shaft.

Reference will now be made in detail to one or more preferred embodiments of the present invention, examples of which are illustrated in the drawings. Each example is provided by way of explanation of the invention, and not meant as a limitation of the invention. For example, features illustrated or described as part of one embodiment can be used in another embodiment to yield still a further embodiment. It is intended that the present invention cover such modifications and variations as come within the scope and spirit of the invention.

The impact tool driver according to the invention is identified generally as 10. Impact tool driver 10 can be used in any application or environment wherein it is desired to impart an impacting drive to a tool. In the embodiments illustrated in the figures, impact tool driver 10 is illustrated as having a conventional ball detente mechanism 44 configured in a shaft 68 for attachment to any manner of tool. For example, a socket could be attached by way of the ball detente mechanism 44. However, it should be understood that this is for illustrative purposes only and the invention is not in any way limited to any specific type of tool or working device. Additionally, impact tool driver 10 can be configured with any conventional driving device, such as a conventional hand drill or other portable tool having a driven spindle or drive shaft. Impact tool driver 10 according to the invention is particularly suited for configuration with a portable hand drill in that it converts such a conventional hand drill into an impact tool, as will be described below.

Figure 2:
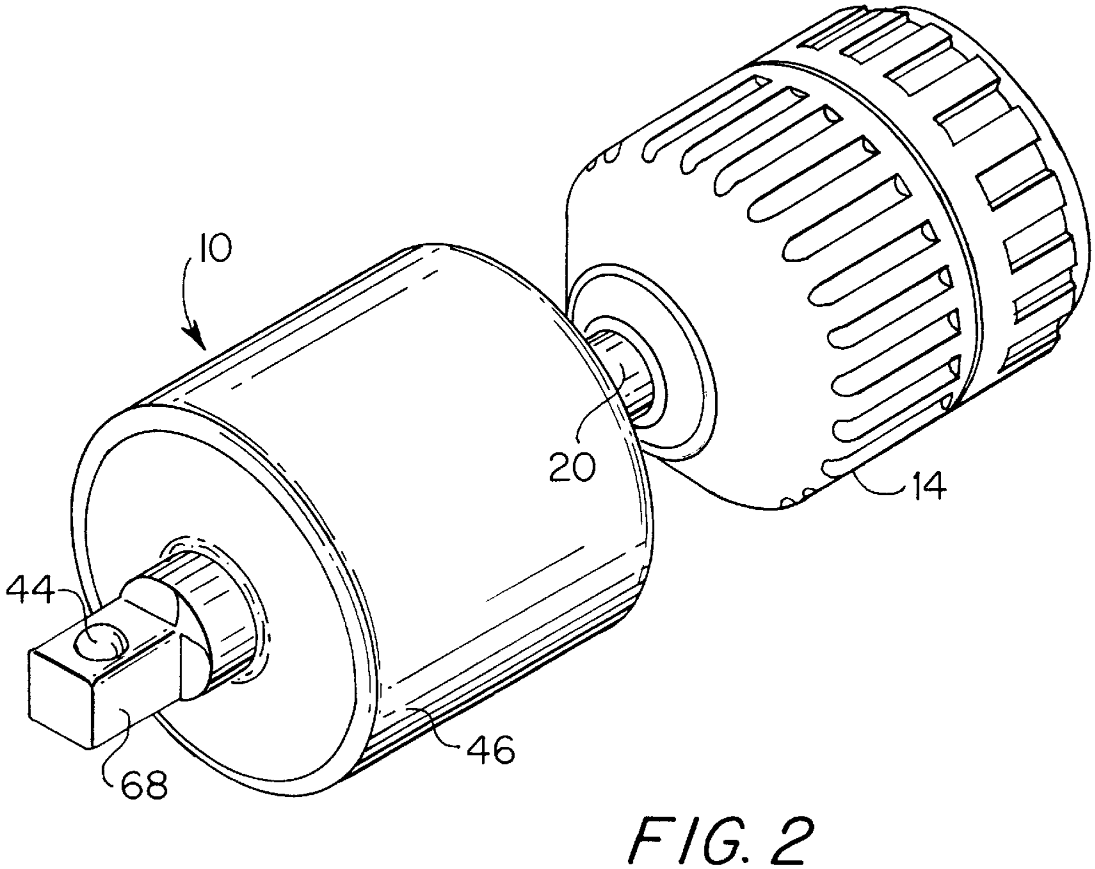
FIG. 2 is a perspective view of an alternative embodiment of the invention mated with a chuck device of a drive tool.

The figures also illustrate only exemplary means for removably attaching impact tool driver 10 to a drive spindle 12 of a tool. For example, FIG. 1 illustrates device 10 held to a drive spindle or shaft 12 by means of a conventional threaded engagement 16. The drive spindle 12 has a male threaded section that threadedly engages within a female receiving section defined in a shank portion 20 of impact tool driver 10. The threaded sections could be interchanged so that impact tool driver 10 contains the male threads. FIG. 2 illustrates impact tool driver 10 held by means of a conventional chuck device 14. It should be appreciated that any mechanical locking mechanism can be utilized for rotationally locking device 10 to a drive spindle. For example, although not illustrated, a set screw type of engagement between the shank 20 and drive spindle 12 could be utilized. Also, any type of conventional chuck device could be utilized, including a keyed or keyless chuck. Any and all such locking mechanisms are within the scope and spirit of the invention and are included in the means for removably attaching impact tool driver 10 to a drive spindle 12.

Also, the invention is not limited by any type of means or mechanism for connecting a tool or working device thereto. The ball and detente device 44 illustrated in the figures is merely an example of one well-known suitable device. For example, device 10 could include a square or multi-sided receptacle for receiving square or hex shaped tool bits. Similarly, the device could include a star-shaped recess for mating configuration with a conventional star-shaped tool shank. A set screw device could also be utilized. These conventional connecting means are well understood by those skilled in the art and need not be explicitly described herein. Any and all such connecting means are within the scope and spirit of the invention.

The impact drive mechanism utilized in one preferred embodiment of the invention as illustrated in the figures and set forth in the following description is a conventional mechanism used as the impacting drive in conventional impact tools, for example impact wrenches from Makita® and Hitachi® incorporate a similar drive mechanism as an integral part of the complete tool.

Figure 7:
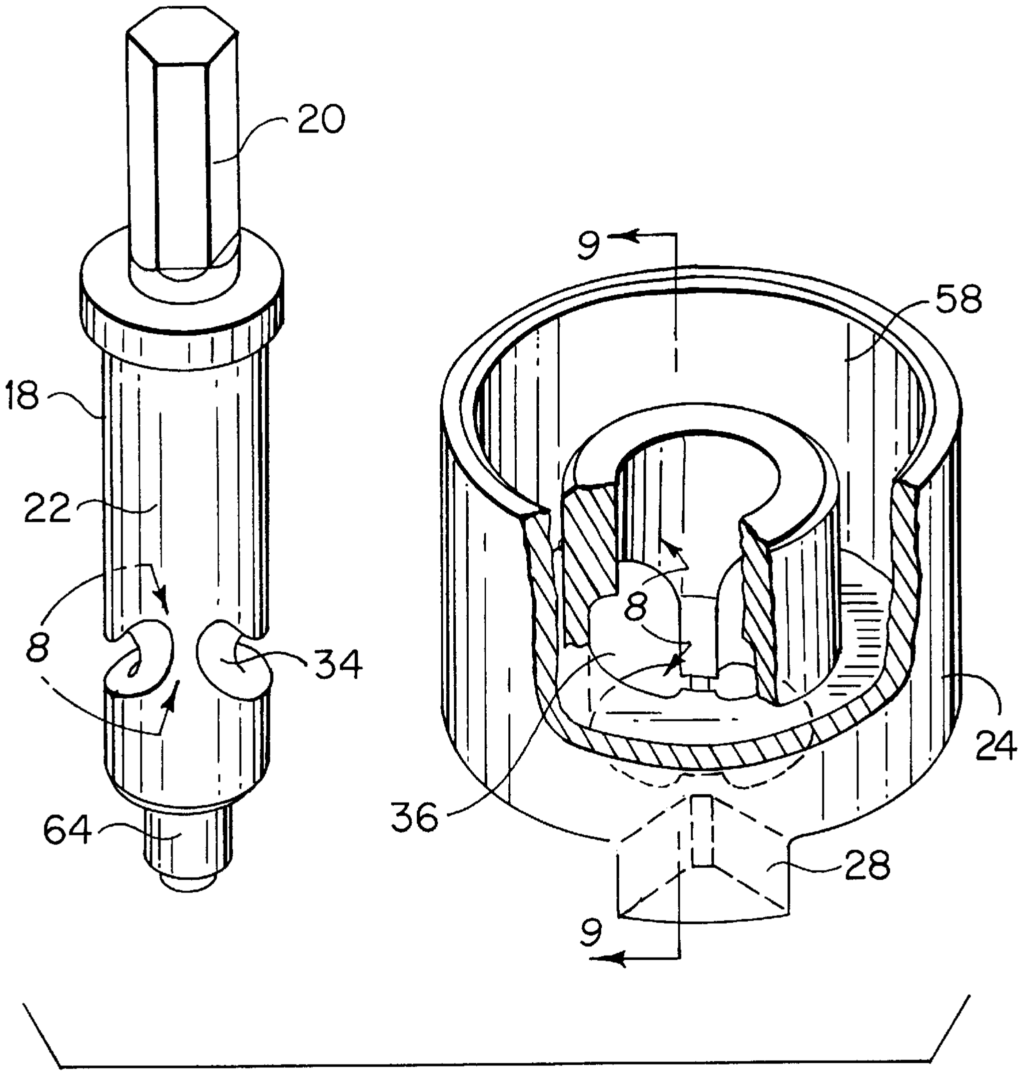
FIG. 7 is a partial component view particularly illustrating the drive shaft and hammer member according to the invention.
Figure 10:
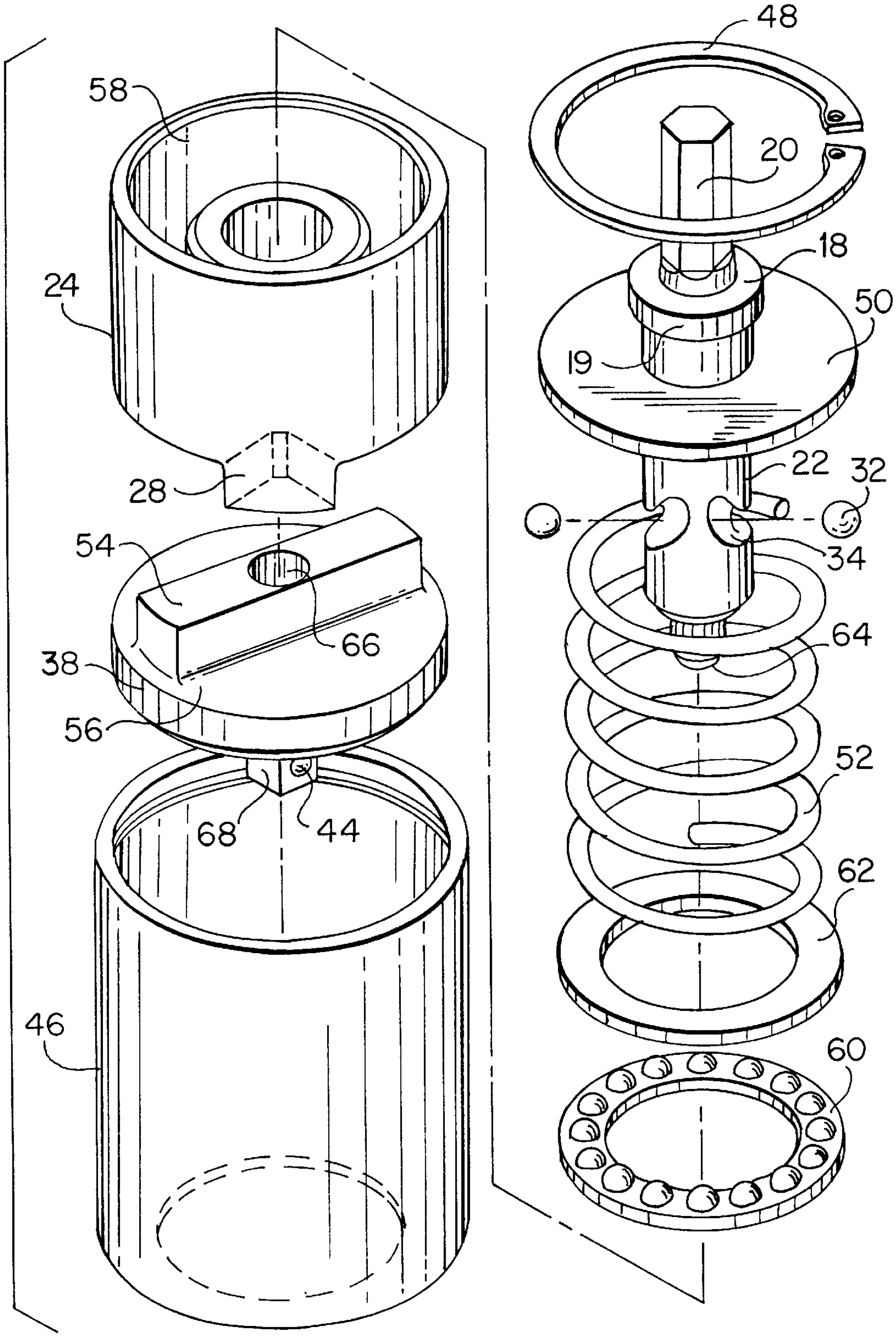
FIG. 10 is an in-line component view of the invention.

Impact tool driver 10 includes a body member, generally 18, which is configured for attachment to a drive spindle of the tool, as described above. In this regard, body member 18 includes a shank portion 20 which may include a threaded receiving portion as shown in FIG. 1, or a multi-sided portion as shown particularly in FIG. 7. Body member 18 is rotationally driven by the drive spindle of a power tool once the body member is rotationally locked to the drive spindle.

Impact tool driver 10 also includes a drive shaft, generally 22, that is configured with body member 18 so as to be rotationally driven therewith. In the embodiment illustrated in the figures, drive shaft 22 is formed as an integral part of body member 18. However, it should be understood, that drive shaft 22 may comprise a separate component that is rotationally locked to body member 18.

A hammer member, generally 24, is rotationally coupled to drive shaft 22 so as to be rotationally driven thereby. Hammer member 24 is axially movable relative to drive shaft 22, as will be explained in more detail below.

Figure 3:
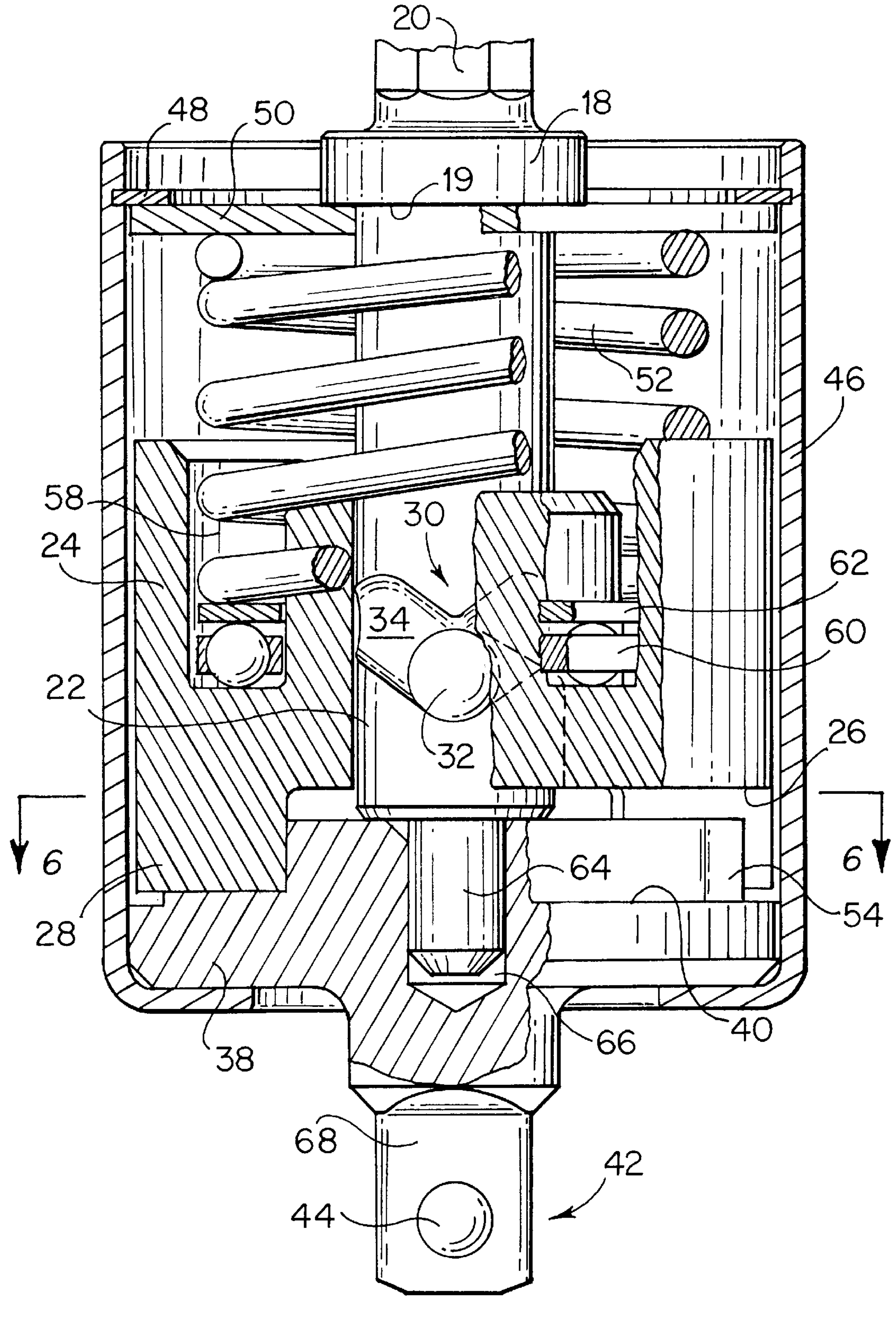
FIG. 3 is a cut-away of a complete assembly of the present invention.
Figure 4:
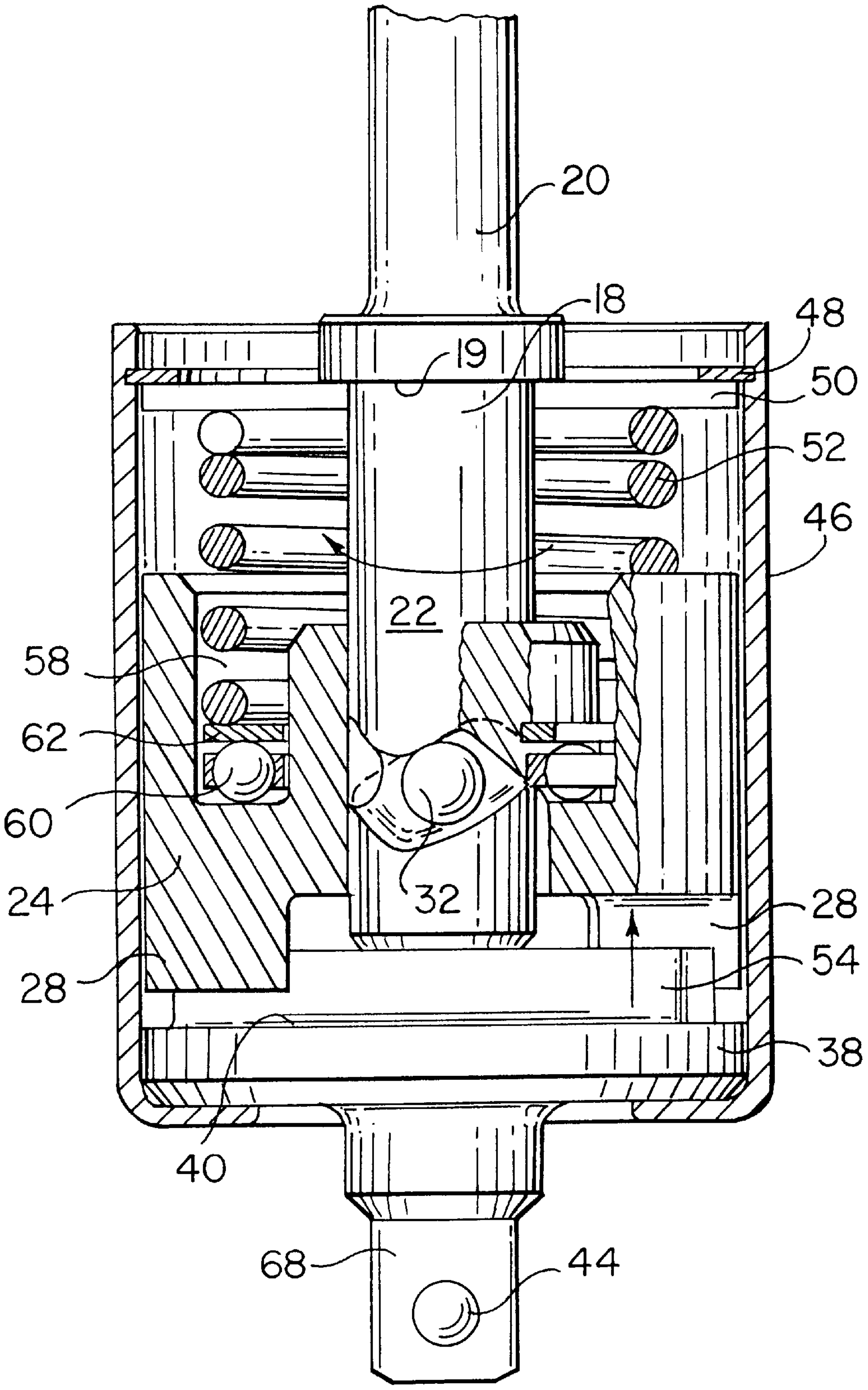
FIG. 4 is a cut-away operational view of the device illustrated in FIG. 3.
Figure 5:
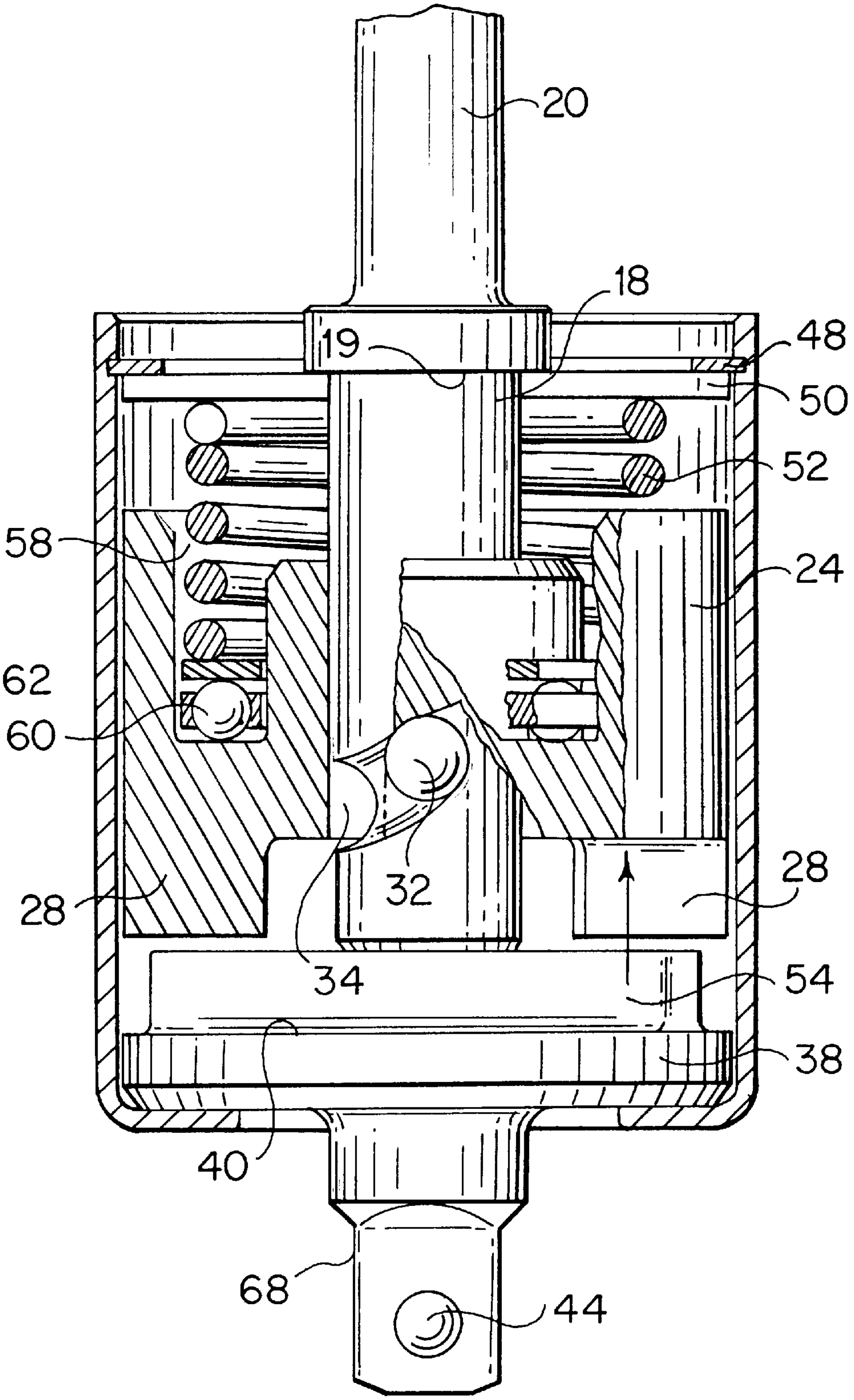
FIG. 5 is a cut-away operational view of the device illustrated in FIG. 3.

Hammer member 24 comprises a first impact face 26 defined thereon which includes at least two impact drivers or lugs 28 defined on impact face 26. The impact lugs or drivers 28 extend longitudinally from first impact face 26, as particularly seen in FIGS. 3 through 5. The impact lugs 28 preferably have a generally triangular shape defining radial impact faces 29, as seen in FIGS. 6a through 6d. Hammer member 24 is co-axial with drive shaft 22 as seen in FIGS. 3 through 5, and includes an annular recess 58 defined therein.

A coupling drive mechanism, generally 30, is operably disposed between drive shaft 22 and hammer member 24 to impact rotational and longitudinal movement to hammer member 24. In the embodiment illustrated, the coupling drive mechanism 30 comprises a ball 32 which resides in opposing helical grooves defined in shaft 22 and hammer member 24. Referring particularly to FIGS. 3 through 5 and 7 through 9, a first helical groove 34 is defined in drive shaft 22. An opposing helical groove is defined in hammer member 24. Ball 32 resides within grooves 34 and 36 respectively. The operation of the device to impart rotational and longitudinal movement to hammer member 24 will be explained in greater detail below.

Impact tool driver 10 also includes an anvil member 38 that is rotationally driven by hammer member 24. Anvil member 38 includes a second impact face 40 that is opposite first impact face 26 of hammer member 24. Anvil member 38 includes an impact receiver configured on impact face 40 for periodic impacting engagement with impact drivers or lugs 28. In the embodiment illustrated, the impact receiver is defined by a protruding member 54 defining radial legs that essentially divides the second impact face 40 into halves 56. Halves 56 define a recess space relative to protruding member 54. Impact drivers or lugs 28 move within recesses 56 and impact against protruding member 54 to rotationally drive anvil member 38.

Anvil member 38 also includes an alignment groove or hole 66 defined therein. An alignment tab 64 extending from body member 18 fits into a groove or hole 66 and provides a bearing and alignment mechanism between anvil member 38 and body member 18.

Anvil member 18 also contains a shank portion 68 having any conventional means 42 for connecting a tool thereto, such as the ball and detente device 44 discussed above. Shank 68 extends through a hole defined in a front face of sleeve member 46.

A biasing spring 52 is disposed within sleeve 46 and resides within annular groove 58 defined in hammer member 24, as particularly seen in FIGS. 3 through 5. A bearing plate 62 and bearing device 60 are also disposed in annular groove 58. A backing plate 50 is fitted onto body member 18 and abuts against a shoulder 19 defined on body member 18. Spring 52 abuts against backing plate 50. A retaining clip or ring 48 holds sleeve member 46 relative to body member 18 and backing plate 50. Spring 52 biases hammer member 24 longitudinally forward against anvil member 38.

In operation, impact tool driver 10 is attached to a drive spindle or shaft 12, as generally shown in FIGS. 1 and 2. When the drive shaft 12 is rotated, body member 18 and drive shaft 22 are also rotated. The helical grooves 34, 36 and ball 32 coupling device imparts a rotational and longitudinal movement to hammer member 24. FIG. 3 illustrates the device wherein impact drivers or lugs 28 are fully within recesses 56 of anvil member 38. Alignment of the ball 32 and grooves 34, 36 corresponds to the representation shown in FIG. 8*a*. As the drive shaft 22 rotates, hammer member 24 is also rotated and caused to move axially relative to drive shaft 22 in a direction towards the back end of the device, as shown in FIGS. 4 and 8*b*. FIG. 8*c* illustrates the device wherein hammer member 24 has moved axially rearward to its fullest extent. At this point, impact drivers or lugs 28 move over protruding member 54. Drive shaft 22 continues to rotate and once impact drivers or lugs 28 pass over protruding member 54, spring 52 causes hammer member 24 to move axially forward so that impact lugs 28 again fall into recesses 56 of anvil member 38. At this point, drive shaft 22 continues to rotate and impact drivers or lugs 28 spin and bang or impact against protruding member 54 thereby imparting a periodic impacting engagement between impact drivers 28 and impact receiver or protruding member 54.

Figure 6B:
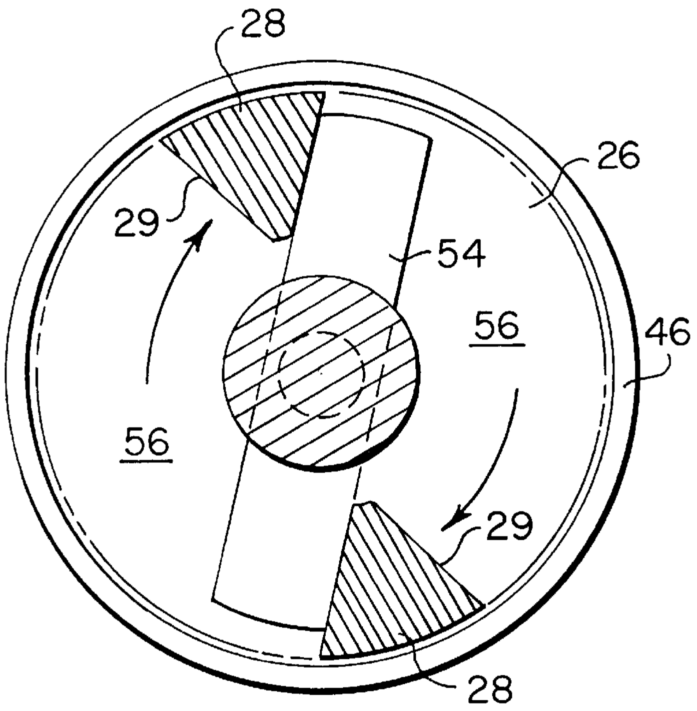
FIGS. 6a–6d are sequential views illustrating the operation of the impact drive mechanism according to the invention.
Figure 6A:
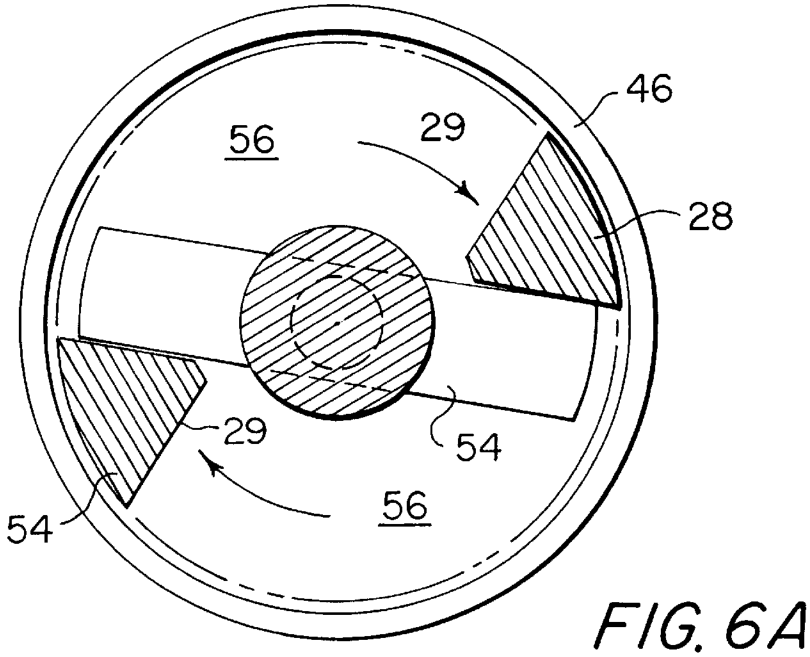
Figure 6C:
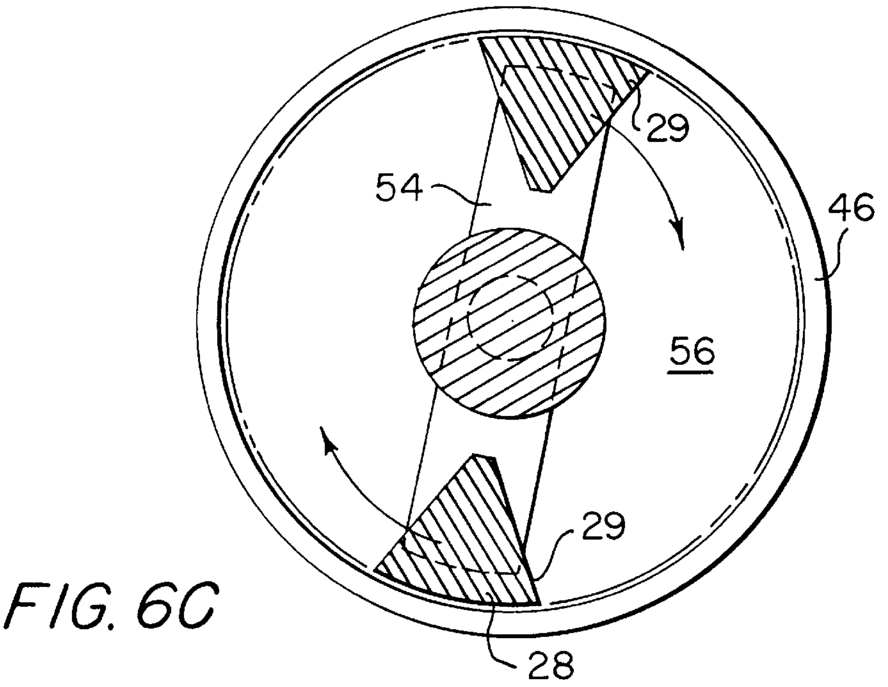
Figure 6D:
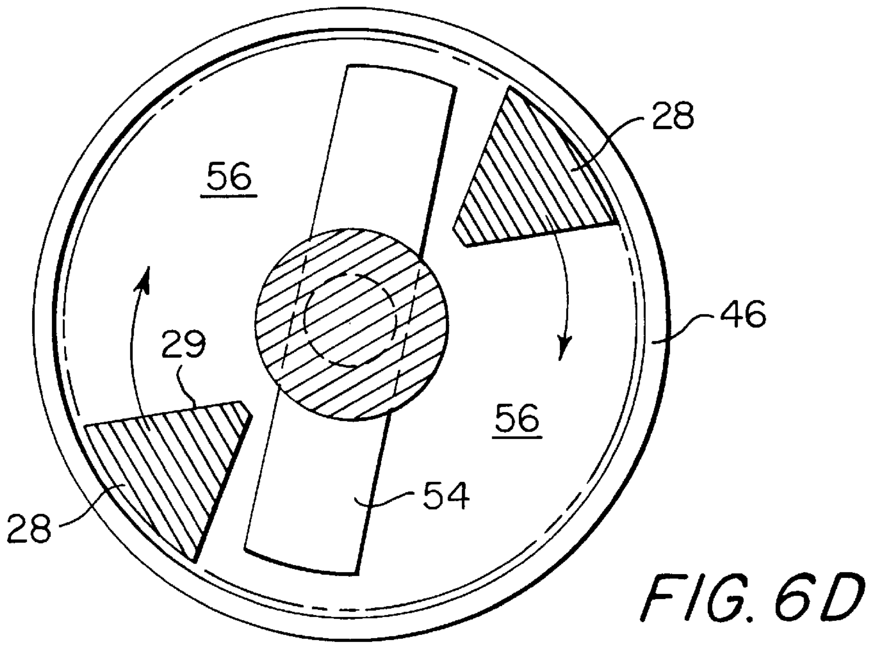

A sequential operational view of the impacting mechanism is provided in FIGS. 6*a* through 6*d*. FIG. 6*a* illustrates the device wherein impact lugs 28 have initially impacted against protruding member 54 and cause protruding member 54, and thus anvil member 38, to rotate in the clockwise direction to the position shown in FIG. 6*b*. Simultaneously with the rotating movement, hammer member 24 is also being moved axially rearward so that impact lugs 28 move over protruding member 54, as seen in FIG. 6*c*. Once impact lugs 28 are completely over protruding member 54, they are forced back into recesses 56 as shown in FIG. 6*d* and continue to rotate again until they impact against protruding member 54.

FIGS. 8*a* through 8*d* show a side view representation of the relative positions of grooves 34, 36, and ball 32. The sequential view of FIGS. 8*a* through 8*d* correspond to sequential FIGS. 6*a* through 6*d*. For example, FIG. 8*a* illustrates the arrangement wherein the hammer member 24 is moved fully axially forward and is rotating within recesses 56, as seen in FIG. 6*a*. FIG. 8*b* depicts hammer member 24 moving axially rearward, and FIG. 8*c* illustrates hammer member 24 in its fullest axially rearward position wherein drive or impact lugs 28 are passing over protruding member 54, as seen in FIG. 6*c*. Thus, it should be understood by those skilled in the art that a rotational and longitudinal movement is imparted to hammer member 24 which, in turn, provides a periodic impacting force to anvil member 38.

It should be understood by those skilled in the art that the driving force of the impact drive mechanism according to the invention depends on a number of factors. For example, the weight of the hammer member relative to the anvil member will affect the degree of force transmitted to the anvil member for each impact. The angle of the impacting face 29 of the impact lugs 28 is also a consideration. Maximum force is imparted if face 29 is flush against protruding member 54. The rotational speed of the impact drivers or lugs 28 is also a consideration and will obviously be affected by the rotational speed of the drive spindle, as well as the diameter of the first impact face 26 defined on hammer member 24. It is well within the level of skill of those in the art to design an impact tool driver according to the present invention with consideration being given to the variables and parameters which will affect the driving force of the impact device depending on the intended environment and use of the impact tool driver.

Figure 11:
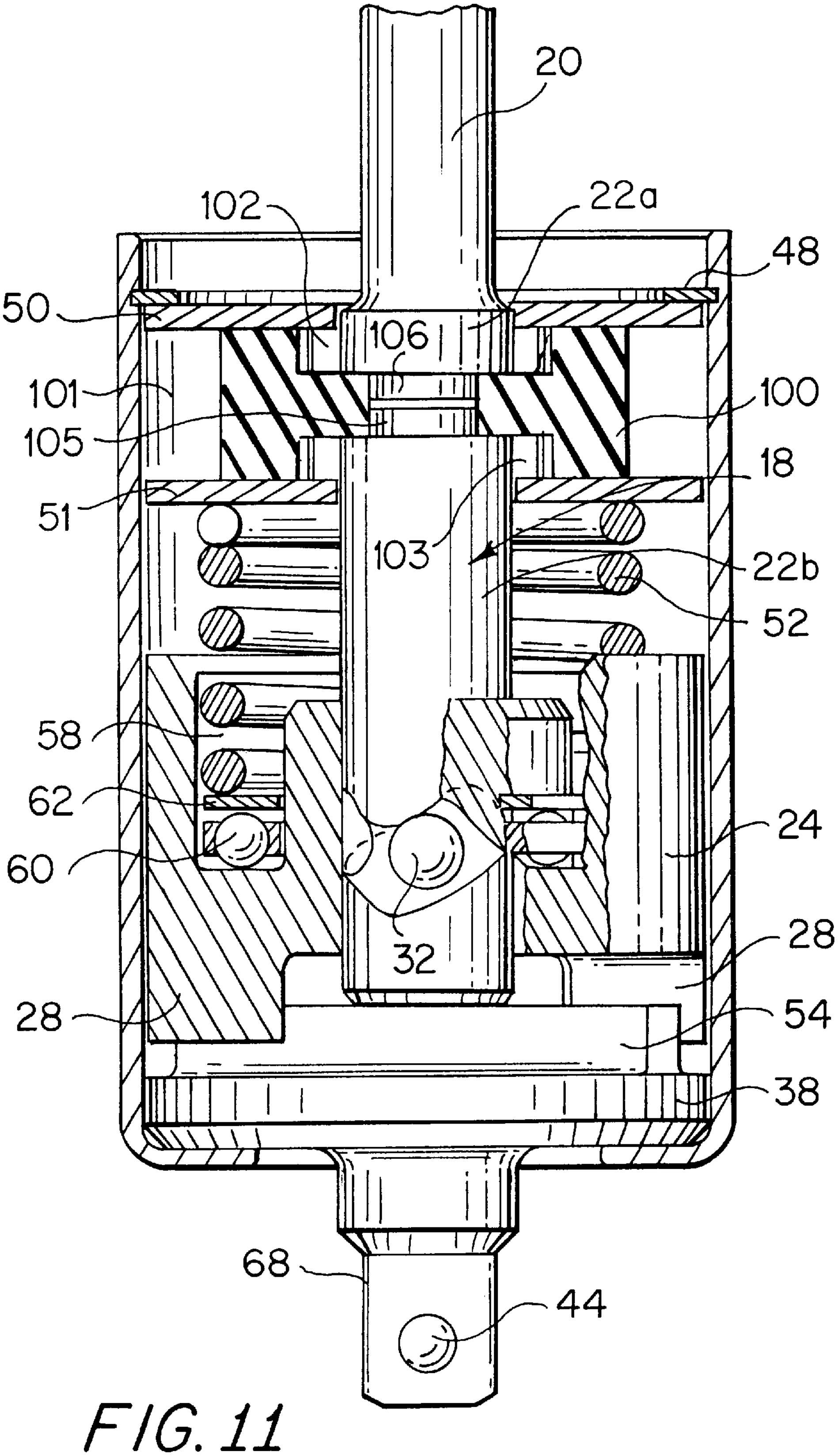
FIG. 11 is a cut-away view of an embodiment of the invention incorporating an elastomeric coupling device in the drive shaft.
Figure 12:
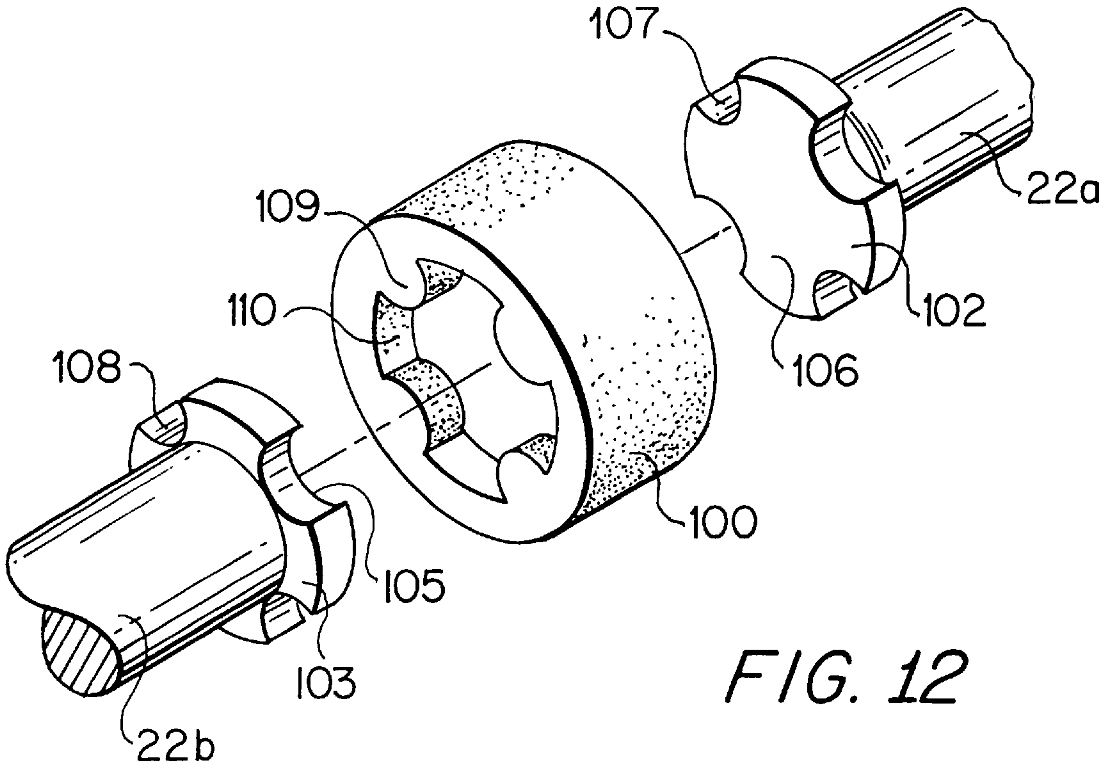
FIG. 12 is a partial assembly drawing of one embodiment of the coupling device of FIG. 11.
Figure 13:
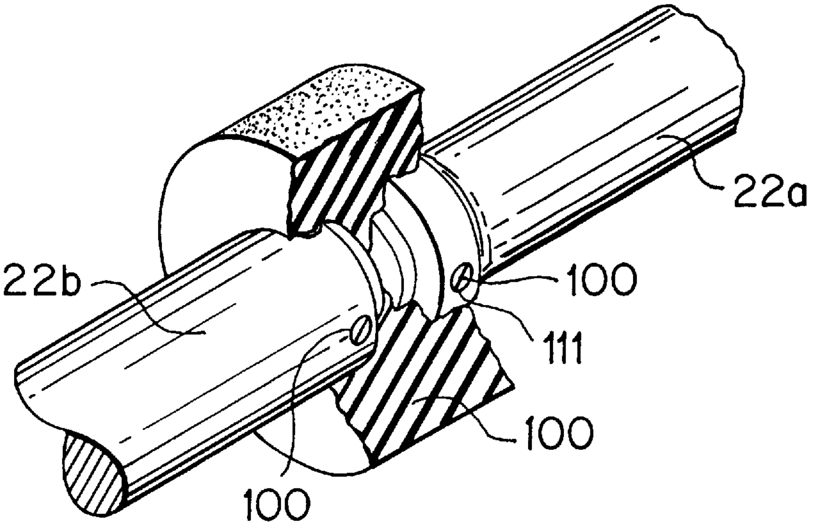
FIG. 13 is an alternative embodiment of the coupling device.

An alternative preferred embodiment of the invention is illustrated in FIGS. 11 through 13. In this embodiment, body member 18 defines a shaft that includes two sections 22*a*, 22*b*. The sections are separated by and rotationally coupled with a coupling device 100. Coupling device 100 is preferably formed of an elastomeric material, such as a soft grade of polyurethane, rubber, or the like. This particular embodiment of the invention may be preferred wherein it is desired to decrease vibrations imparted back through the body member to the power tool or user. The elastomeric coupling device 100 absorbs the vibrations and substantially reduces the vibrations imparted to the power tool or user. As can be seen in FIG. 11, drive shaft sections 22*a* and 22*b* are axially spaced apart and are not physically engaged with each other. Referring also to FIG. 12, shaft section 22*a* includes a front end or hub portion 106 with radially extending drive dogs 102. Recesses 107 are defined between the drive dogs 102. Likewise, drive shaft section 22*b* includes an end or hub 105 with radially extending drive dogs 103 and recesses 108 defined therebetween. Elastomeric coupling 100 also includes drive dogs 109 separated by recesses 110 for rotational coupling engagement with drive dogs 102, 103. With this arrangement, it should be understood that as shank portion 20 of body member 18 is rotationally driven, first shaft section 22*a* drives second shaft section 22*b* through the rotational coupling 100.

An alternative embodiment of the coupling device is illustrated in FIG. 13. In this embodiment, shaft sections 22*a* and 22*b* comprise holes 111 defined therein. In this embodiment, the elastomeric material is co-molded with the shaft sections so that the material fills holes 111 and also the space between faces 106, 105, of the shaft portions. In this manner, coupling 100 is molded or integrally formed with the shaft portions.

It should be appreciated that coupling 100 is meant to rotationally couple the drive shaft sections while simultaneously absorbing vibrations imparted to the shafts from the hammer mechanism. In this regard, coupling 100 can be formed of any manner of conventional material for fulfilling this purpose. Any number of materials and construction of device 100 are within the scope and spirit of the invention.

Referring again to FIG. 11, it can be seen that coupling 100 resides in a recess 101 defined between backing plate 50 and an additional plate 51. Plate 51 is fitted onto second shaft section 22*b*. Spring 52 bears against the opposite side of plate 51.

Various other modifications and variations can be made in the present invention without departing from the scope and spirit of the invention. It is intended that the present invention cover such modifications and variations as come within the scope of the appended claims and their equivalents.

What is claimed is:

1. A portable impact tool driver configured for removable attachment to a drive spindle of a power tool, comprising:

a body member removably connectable to a rotational drive member of a power tool;

a drive shaft operably configured with said body member so as to be rotationally driven therewith;

a hammer member rotationally coupled to said drive shaft so as to be rotationally driven thereby, said hammer member axially movable along said drive shaft, said hammer member further comprising a first impact face configured thereon with at least two impact drivers defined on said impact face;

a coupling drive mechanism operably disposed between said drive shaft and said hammer member to impart rotational and longitudinal movement to said hammer member;

an anvil member comprising a second impact face opposite said first impact face with an impact receiver configured thereon for periodic impacting engagement with said impact drivers, said anvil member further comprising means for connecting a tool or working device thereto;

wherein said hammer member is rotationally driven by said drive shaft while simultaneously moved axially back and forth relative to said drive shaft so that said impact drivers move into and out of rotational impacting engagement with said impact receiver; and wherein said drive shaft further comprises first and second sections and an elastomeric coupling disposed between and drivingly engaged with said two sections to rotationally couple said two sections, said coupling formed substantially of an elastomeric material so as to reduce vibrations transmitted from said hammer member to said body member or power tool.

2. The impact tool driver as in claim 1, wherein said first section of said drive shaft is formed integral with said body member.

3. The impact tool driver as in claim 1, further comprising a sleeve member housing said drive shaft, said hammer member, and said anvil member.

4. The impact tool driver as in claim 1, further comprising a biasing member axially biasing said hammer member into engagement with said anvil member.

5. The impact tool driver as in claim 1, wherein said coupling drive mechanism comprises a helical groove defined in said drive shaft and a complimenting radially opposite groove defined in said hammer member, and a drive ball disposed in said grooves wherein said helical groove and drive ball impart rotational and axial movement to said hammer member as said drive shaft rotates.

6. The impact tool driver as in claim 1, wherein said impact drivers comprise circumferentially spaced lugs defined on said first impact face, and said impact receiver comprises corresponding protruding members defined on said second impact face with circumferential recesses defined between said protruding members, said lugs axially movable into and out of said circumferential recesses for periodic rotational engagement with said protruding members as said drive shaft rotates.

7. The impact tool driver as in claim 6, wherein two radially opposite said lugs defined on said first impact face, and said protruding members comprise radially opposite legs defined on said second impact face.

8. The impact tool driver as in claim 1, wherein said body member comprises a longitudinally extending shank configured to be held by a chuck device.

9. The impact tool driver as in claim 1, wherein said body member comprises a threaded longitudinally extending shank configured for threaded engagement with a drive spindle.

10. The impact tool driver as in claim 1, wherein said hammer member comprises an annular groove defined on a face thereof opposite said first impact face, and a spring disposed within said annular groove biasing said hammer member axially towards said anvil member.

11. The impact tool driver as in claim 1, wherein said elastomeric coupling comprises rotational drive dogs in engagement with drive dogs defined in opposite faces of said first and second drive shaft sections.

12. The impact tool driver as in claim 1, wherein said elastomeric coupling comprises is formed integrally with opposite faces of said first and second drive shaft sections.

13. The impact tool driver as in claim 12, wherein said elastomeric coupling is molded with said first and second drive shaft sections.

14. A portable impact tool adapter configured removable attachment to a portable power tool to convert said power tool to an impact tool, said adapter comprising:

a body member configured to be removably mounted to a drive spindle of a power tool;

a sleeve member attached to said body member and surrounding at least a portion thereof;

a hammer member disposed within said sleeve member rotationally coupled to said body member and axially movable relative thereto, said hammer member comprising a front face having drive lugs configured thereon;

an anvil member disposed adjacent said hammer member and having a back face with driven lugs configured thereon, said anvil member further comprising means for receiving a tool or work device;

a biasing element operationally disposed to bias said hammer member towards said anvil member;

means for transferring rotational movement of said body member to rotational and axial movement of said hammer member so that said drive lugs move axially into and out of impacting rotational engagement with said driven lugs as said body member is rotated and wherein said body member further comprises a first shaft section and a second shaft section, and an elastomeric coupling disposed between and rotationally coupling said first and second shaft sections so as to reduce vibrations imparted by said hammer member to the power tool.

15. The adapter as in claim 14, wherein said means for transferring comprises a ball residing in circumferential grooves defined in said body member and said hammer member, at least one of said grooves having a longitudinal component so as to generate axial movement of said hammer member.

16. The adapter as in claim 15, wherein one of said body member shaft sections comprises a longitudinal shaft portion extending through said hammer member, said hammer member axially movable back and forth along said shaft portion, said ball and grooves disposed in the region of said shaft portion.

17. The adapter as in claim 14, further comprising drive dogs rotationally connecting said elastomeric coupling and said shaft sections.

18. The adapter as in claim 14, wherein said coupling is formed integral with said first and second shaft sections.

* * * * *